United States Patent Office 3,153,909
Patented Oct. 27, 1964

3,153,909
AUTOMATIC HYDRAULIC TRANSMISSION
John A. Balaban, 4142 Graham St., Pleasanton, Calif.
Filed Nov. 13, 1962, Ser. No. 237,127
10 Claims. (Cl. 60—53)

This invention relates to improvements in automatic hydraulic transmission. The principal objects of this invention are:

First, to provide an automatically variable transmission in which the torque reaction of a driven load is balanced against a centrifugally actuated control member connected to vary the output of the transmission with the centrifugally actuated control element having a substantially greater mechanical advantage on the output adjusting element than the torque reaction.

Second, to provide an automatically variable hydraulic transmission in which a variable stroke pump element is acted upon by a centrifugally driven control and reacted upon by the load applied to the transmission with the centrifugally actuated control biased to zero displacement of the pump at a predetermined minimum of speed and limited to maximum displacement at a speed substantially less than the maximum speed of the transmission.

Third, to provide an automatically variable hydraulic transmission with a clutch connection to a driving engine which is operable by oil pressure from the lubricating system of the engine and which can be controlled by connecting and disconnecting the oil pressure of the engine.

Fourth, to provide an automatically variable hydraulic transmission having a minimum amount of friction both mechanically and hydraulically between the moving parts of the transmission to provide maximum efficiency of the transmission.

Fifth, to provide an automatically variable hydraulic transmission in which a constantly rotated crank is adjustable from zero to maximum eccentricity to vary the output of a variable capacity pump with the adjustment of the crank element being effected by centrifugal weights driven at the same speed as the crank and connected to the crank by non-linear cams so that variation of the eccentricity of the crank is different at slow speed ratios than at high speed ratios of the crank Other objects and advantages of the invention will be apparent from a consideration of the following description and claims. The drawings, of which there are five sheets, illustrate a highly practical form of the transmission and one modified form of fluid pump operable in the transmission.

The example of the transmission illustrated in FIGS. 1 to 4 consists of a housing 1 having a flanged end 2 adapted to be bolted to a prime mover such as an internal combustion engine to embrace the drive shaft 3 of the engine. It is an incidental feature of the transmission that the drive shaft 3 may be drilled or otherwise provided with an oil pressure supply passage 4 from the oil pump of the engine and a return passage 5 to the crank case of the engine as will be understood. The shaft 3 is connected to the hub 6 of a clutch housing 7 positioned in the transmission housing 1. The clutch housing 7 may constitute a flywheel for the engine and is provided with a rear friction plate 8 forming a disk-like annular recess 9. In some installations such as electric generator drive, the clutch may be omitted.

Figure 1:
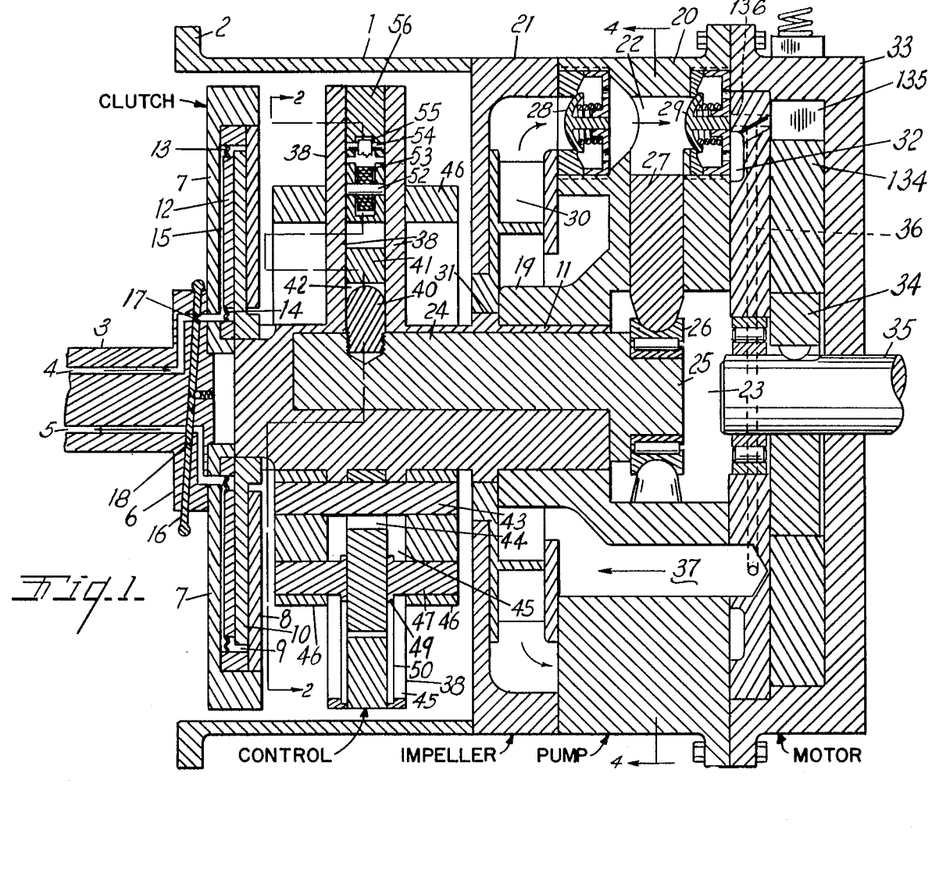
FIG. 1 is a fragmentary longitudinal cross sectional view through the transmission taken along the plane of the broken line 1—1 in FIG. 2.
Figure 2:
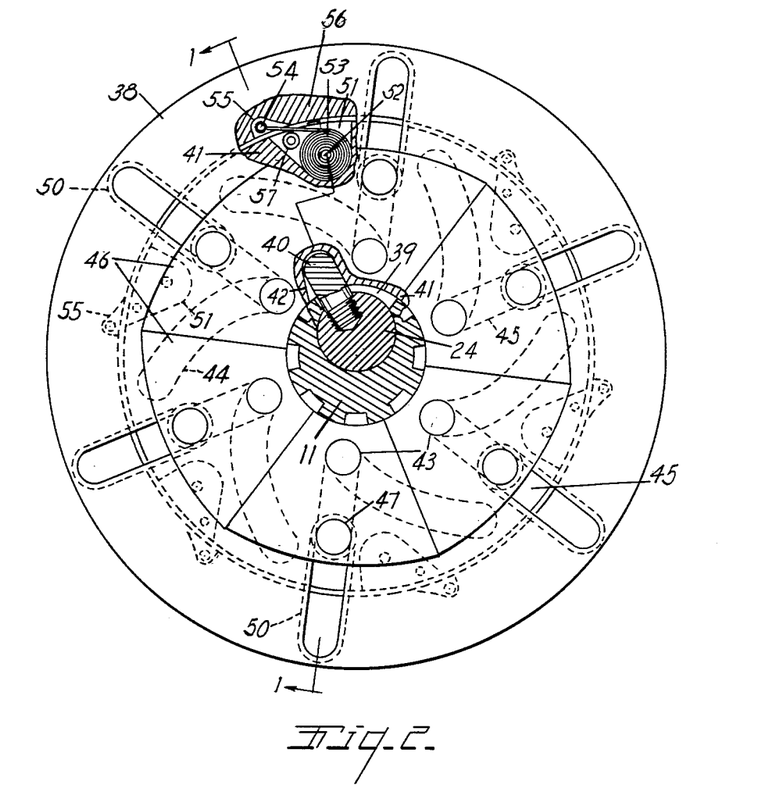
FIG. 2 is a fragmentary transverse cross sectional view taken along the plane of the broken line 2—2 in FIG. 1.
Figure 3:
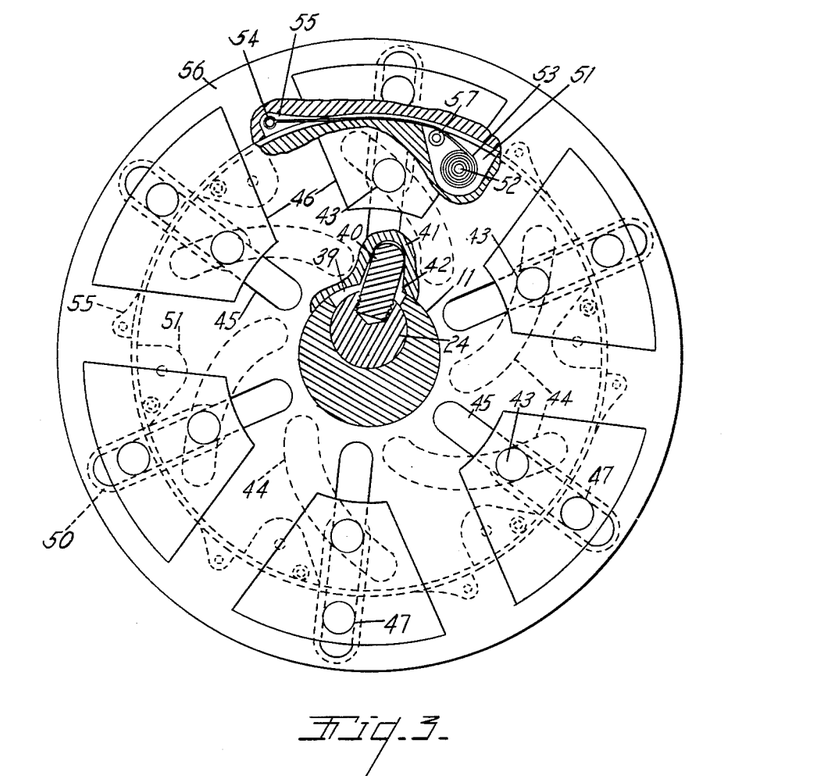
FIG. 3 is a view similar to FIG. 2 showing the parts of the transmission operating at an intermediate speed ratio.
Figure 4:
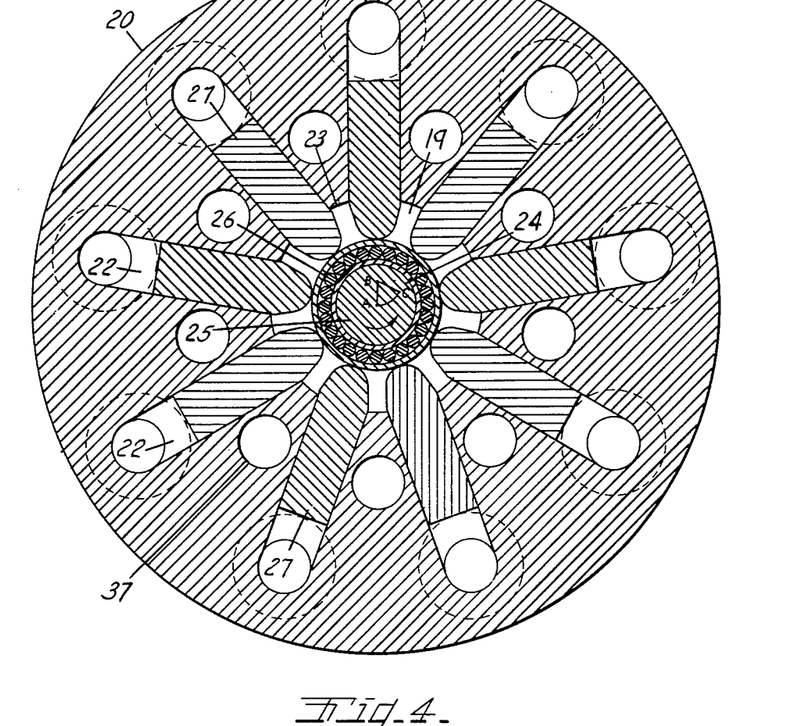
FIG. 4 is a transverse cross sectional view taken along the plane of the line 4—4 in FIG. 1 looking in the direction of the arrows.

A clutch plate 10 is drivingly and slidably mounted on the forward end of a pump shaft 11 and positioned in the clutch housing in opposed relation to the friction plate. An annular pressure plate 12 is mounted within the clutch housing and connected thereto by flexible diaphragms 13 and 14 to form a pressure chamber 15 communicating with the oil passages 4 and 5.

A control pin 16 mounted in the hub 6 intersects the passages 4 and 5 and has portions of reduced size 17 and 18 selectively positionable in the passages to either admit engine oil pressure to the chamber 15 or exhaust oil pressure therefrom. When pressure is admitted to the chamber, the pressure plate 12 clamps the clutch plate 10 in driving engagement against the back plate 8 of the clutch housing to drive the pump shaft 11 at the same speed as the engine shaft 3. The pin 16 can be actuated selectively by the operator of the transmission by various means such as a mechanical linkage or an electromagnet. The particular method of operating the control pin is unimportant to the novel details of the transmission so no special actuator is illustrated. As previously mentioned, the clutch may be omitted in which case the pump shaft will be driven directly by the engine.

The pump shaft 11 is rotatably mounted in the bearing 19 of a pump housing 20. The housing 20 is connected to the transmission housing 1 through an intermediate impeller housing 21. No attempt has been made to indicate or specify the particular way of forming or joining the housing elements as it is believed that this can be accomplished in a variety of ways by anyone skilled in the art. The pump housing 20 defines a plurality of angularly spaced radial pump chambers 22 opening inwardly to a central cavity 23 enclosing the rear end of the pump shaft 11. A control shaft 24 is relatively rotatably mounted within a bore provided therefor in the pump shaft and as will be noted particularly in FIGS. 1 and 2, the control shaft 24 is eccentric to the central axis of the pump shaft 11.

At its rear end the control shaft 24 carries a crank or drive element 25 which is in turn eccentric to the axis of the control shaft. These eccentricities are desirably equal so that rotation of the control shaft 24 can swing the crank 25 into concentric relation with the pump shaft 11. In FIGS. 4 to 7 the axis of the pump shaft which remains constant is indicated by the letter A while the axis of the control shaft which orbits about the pump shaft is indicated by the letter B. The center of the crank 25 which orbits with the control shaft and is adjustable radially of the pump shaft as will be described is indicated by the letter C. The diagrammed position of center or axis C in FIG. 4 indicates the position to which it may be moved relative to a position coincident with point A as the structure is illustrated in this figure.

The crank or drive element 25 operates through a suitable bearing 26 to reciprocate a plurality of pump pistons 27 positioned in the pump chambers 22. Varying the eccentricity of the crank 25 will vary the stroke of the pistons and therefore the output of the pump assembly. At the radially outer end of each pump chamber there is provided an outwardly seating inlet check valve 28 and an outlet check valve 29. The pump chambers 22 are assured a full supply of oil and the pump pistons 27 are returned inwardly by oil supplied by a rotary impeller 30 mounted in the impeller housing 21 and driven at engine speed from the pump shaft as at 31. (See FIG. 1.) Output from the several pump chambers is directed through the outlet valves 29 to an annular chamber 32 in the hydraulic motor housing 33. The motor housing 33 may contain any suitable type of hydraulic pressure positive displacement motor and by way of example there is illustrated a rotary type of motor having an eccentric driven impeller or rotor 34 drivingly connected to an output or driven shaft 35. A rotor ring 134 is driven orbitally by oil admitted behind a reciprocating vane 135 from the port 136 and collecting chamber 32. Oil is returned from the motor from the opposite side of the vane through passage 36 and from there directed through the return passages 37 to the inlet of the impeller 30. As noted the hydraulic motor 33 may be of various designs and may even be located remotely form the transmission and the supply passage 32 from the pump.

The mechanism for automatically adjusting the eccentricity of the crank 25 is contained in the transmission housing 1 ahead of the pump housing 20 and impeller housing 21. The pump shaft 11 carries two axially spaced guide plates 38. The shaft 11 has an arcuate slot 39 formed therein and opening between the guide plates and a control pin 40 threaded into the control shaft 24 projects through the slot between the guide plates. An annular control plate 41 is rotatably mounted around the pump shaft between the guide plates and has a notch 42 formed in its inner surface receiving the pin 40. Rotation of the control plate 41 relative to the pump shaft will thus angularly advance or retract the control shaft 24 and the crank 25 relative to the pump shaft within the limits permitted by the length of the arcuate slot 39. In the example illustrated, this is less than 60° as each arcuate 44 occupies less than ⅙ of the circumference of the control plate.

Motion of the control plate 41 is effected by a plurality of pins 43 passed through curved slots 44 at angularly spaced positions around the control plate. The pins 43 project through radial slots 45 in the guide plates 38 and engage the radially inner ends of segmental shaped centrifugal weights 46 positioned on the outer sides of the guide plates. The pins 43 are thus restricted to radial motion relative to the guide plates and in moving radially the pins bear against the edges of the curved slots 44 in the control plate and cause the control plate to move angularly relative to the pump shaft. The outer ends of the weights 46 are retained and guided relative to the guide plates 38 by pins 47 engaged with the weights and having headed inner ends 49 received behind the shoulders 50 cut back from the outer edges of the slots 45.

In order to control the action of the weights 46 under centrifugal force and to return the weights radially inwardly, the outer periphery of the control plate 41 is provided with a plurality of angularly spaced radially outwardly opening recesses 51 having anchor pins 52 extending thereacross. The pins 52 anchor the inner ends of helically coiled springs 53 to the control plate and the outer ends of the springs are extended and connected to anchor pins 54 mounted in recesses 55 in the radially inner face of a spacer plate 56 secured between the outer edges of the guide plates 38. By comparison of FIGS. 2 and 3 it will be noted that angular advance of the control plate 41 under the influence of the cross pins 43 and the weights 46 extends or advances the control plate clockwise as viewed in these figures and in advancing relation relative to the guide plates 38 and the pump shaft. The coiled springs 53 are extended and tensioned by this advancing motion passing over guide rollers 57 in the recesses 51. The springs are thus tensioned and return the control plate and the centrifugal weights to retracted position when the rotational speed of the pump shaft and the centrifugal weights fall below a predetermined minimum.

In installations of the transmission for automotive use, the strength of the several springs 53 is desirably calibrated relative to the weights and inertia forces of the centrifugal weights 46 to hold the control plate 41 retracted until the pump shaft 11 has attained a predetermined minimum speed such as 700 r.p.m. to permit the driving engine and shaft 3 to attain operating speed before the transmission moves to adjust the crank 25 to any eccentric position. After the desired minimum speed has been reached, the springs 53 are capable of permitting maximum radially outward displacement of the centrifugal weights 46 with a speed increase of between 50 and 100 r.p.m. of the transmission shaft 11. Thus in the example cited, the weights 46 will be fully extended and the control plate 41 fully advanced at between 750 and 800 r.p.m. and any speed thereabove to provide maximum eccentricity of the crank 25 and maximum displacement of the pump element pistons 27. This is under no load condition.

Figure 5:
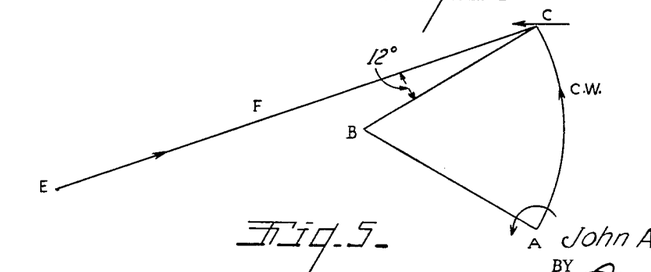
FIG. 5 is a vector diagram of the centers of rotation of the adjustable parts of the transmission relative to the reaction forces applied thereto with the adjustable parts adjusted to maximum speed ratio.
Figure 6:
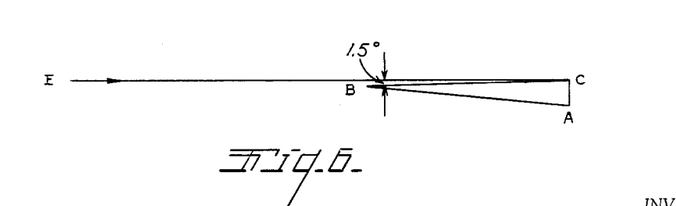
FIG. 6 is a vector diagram similar to FIG. 5 showing the relationship of the parts and forces in the transmission operating at slow speed ratio.

The torque reaction forces of the pump element pistons 27 on the crank 25, of course, tend to reduce the eccentricity of the crank on the pump shaft and return the control shaft 24 to retracted position in opposition to the force created by centrifugal weights 46 tending to advance the control shaft and increase the eccentricity of the crank. With reference to the vector diagrams in FIGS. 5 and 6 it will be seen that the torque reaction forces of the several piston elements 27 indicated as to direction by the vector EC will be directed oppositely to the rotation of the pump shaft and the crank shaft about the point A which remains fixed. However, the turning moment of this vector force EC tending to decrease the eccentricity of the crank is applied at a relatively small angle or moment arm about the axis B of the control shaft. In FIG. 5 which represents the condition of the control shaft and crank under conditions of maximum eccentricity the angle ECB is only about 12°. When the crank 25 is offset about ⅛ of its maximum eccentricity, the crank angle is reduced to 1.5° as shown in FIG. 6. This relationship or characteristic of the vector force EC or reaction force of the several pump elements involves and results from an integration of the reaction forces of the several pump pistons, on the advancing (working) side of the eccentric crank, multiplied by the different moment arms of the force of each piston directed radially of the fixed axis A of the pump shaft, but at different angles and different distances or moment arms from the axis A depending on the eccentricity of the crank 25 and its center C. By hypothesis, the eccentricity of C relative to B in equal to, or approximately equal to, the eccentricity of shaft center B relative to center of rotation A and can be adjusted so that there is no eccentricity. In this case there is no pumping and no vector force EC, or it may be considered as an infinitely small vector force applied through center A. The slot 39 limits the rotation of control shaft 24 and crank 25 relative to the pump shaft 11. As point C moves away from point A (approximated to ⅛ of the maximum movement in FIG. 6) the force vector EC becomes finite and at a small moment arm relative to both points A and B. For any given eccentricity, the moment arm of the integrated vector force EC relative to center A will be a function of the eccentricity of crank 25 and will increase more rapidly than the moment arm of the vector relative to the control shaft center B.

Since control shaft 24 preferably lies wholly within the circumference of pump shaft 11 to permit bearing 19 to support the pump shaft and to permit control plate 41 to have rotatable bearing support on shaft 11, the eccentricity of the control shaft 24 relative to the center of pump shaft 11 which is AB and which approximately equals BC must be no greater than one half of the radius of shaft 11. The maximum angle CBA for a control shaft and plate having six control slots is about 60° and the integration of the sum of the reaction force vectors and their moment arms relative to center A produces a vector force EF along the line EC which is about 12° from the line BC at maximum eccentricity. The ratio of 60° for angle CBA to 12° for angle ECB when reduced to ⅛ of angle CBA is about 1.5° for reduced angle ECB. In each instance the moment arm of the centrifugal force of the weights 46 tending to advance or increase the eccentricity of the crank remains substantially constant being applied at constant radius AB about the axis B of the control shaft.

The action of the transmission is such that the drive shaft 3 is permitted to come to a minimum operating speed and to then apply load through the transmission at a high ratio and low eccentricity of the crank 25 for starting the load. That is, each revolution of the pump shaft produces a small volume of fluid displacement at high pressure which in turn produces low speed, high torque in the driven motor 33. The ratio rapidly decreases by radial extension of the counterweights 46 in a relatively small speed range after which the ratio of the transmission remains relatively constant unless a sudden increase in the load reaction or torque causes the reaction force corresponding to the vector EC to overcome the action of the centrifugal weights partially or temporarily.

Figure 7:
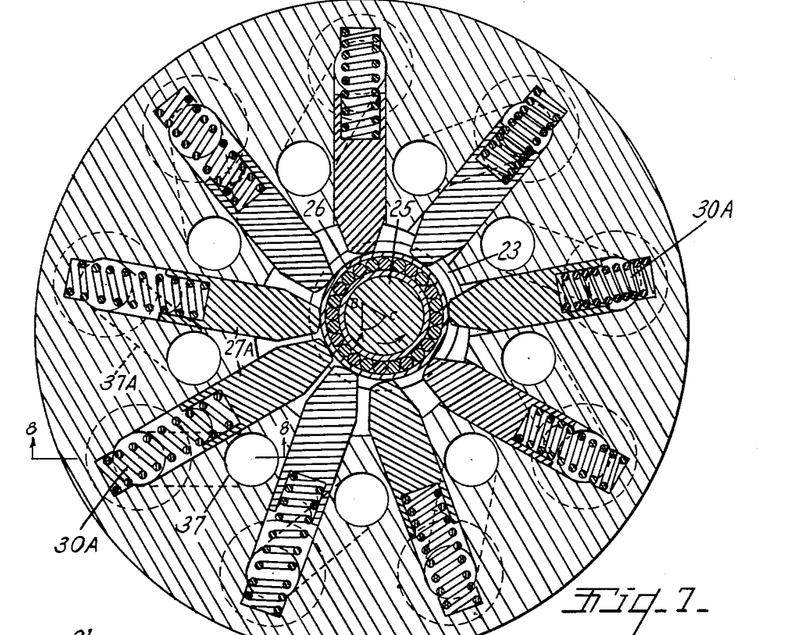
FIG. 7 is a fragmentary cross sectional view similar to FIG. 4 showing a modified form of adjustable hydraulic pump for the pump.
Figure 8:
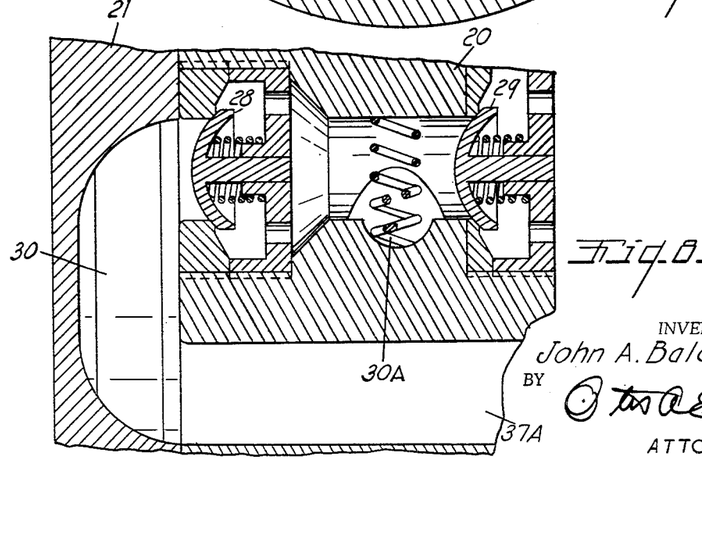
FIG. 8 is a fragmentary cross sectional view taken along the plane of the line 8—8 in FIG. 7.

FIGS. 7 and 8 illustrate a slight modification of the hydraulic pump unit of the transmission. In this modification the pump piston elements 27A are provided with individual return or retracting springs 30A which take over the function of the impeller 30 in the first form of the transmission in returning the pistons inwardly. The impeller 30 as an element is omitted and the return passage 37A from the hydraulic motor is connected directly to the inlet check valve 28 which remains the same as in the first form of the transmission.

The essential relationships between the parts or control elements of the transmission are as follows: The centrifugally actuated weights are effective, under no load conditions, to move the crank 25 to maximum eccentricity at a relatively slow but still substantial r.p.m. As stated, the springs 53 hold the weights retracted from zero to a preset slow speed after which the centrifugal force on the weights quickly overcomes the springs. The weights 46, acting through the control plate 41 tend to advance the control shaft 24 and crank 25 relative to the continuous or continuing rotation of the pump shaft 11. The resulting eccentricity of the crank 25 imparts pumping motion to the pistons 27 and any load on the pump creates a reaction force on the crank. The reaction force which corresponds to and varies with the torque or load applied to the pump tends to decrease the eccentricity. Thus the applied torque or load is balanced against or opposed to the centrifugal action of the weights 46 tending to keep the pump at maximum output. Either force may overcome the other. A locked hydraulic motor and pump pistons 27 may prevent any eccentric advance of the crank 25 and an excess of applied power in the eccentric and pump pistons over the reaction force applied by the motor permits the weights to move the crank to maximum eccentricity. Between these two extremes the forces applied to the crank automatically seek a balance.

The centrifugal weights 46, at any given speed above the maximum at which the springs 53 are effective, act with varying degrees of force tending to advance the control plate 41 and the crank. The weights are most effective as they are forced inwardly by retracting or collapsing action of the torque on the eccentricity of the crank. Thus a sudden increase in torque load as by a vehicle driven by the transmission encountering an up grade will result first in a tendency for the pump shaft 11 and centrifugal weights to slow down under increased resistance and in rapid angular retraction of the control shaft 24 and plate 41 and radial retraction of the weights 46. The driving engine and pump shaft will continue to operate at about the given fixed speed and power, other factors such as the engine throttle being unchanged. Conversely, in moving from an up grade to level travel, the reduction in torque load permits the centrifugal action of the weights 46 to become increasingly effective to advance the control shaft and the crank to increase the output of the pump and the speed of the vehicle.

The spiral conformation of the slots 44, which coact with the pins 43 in moving the control plate, functions to overcome or counterbalance the variable effect of the centrifugal weights at different radially adjusted positions. At the radially inwardly adjusted positions of the pins and weights where the weights have the least effect, the relatively small inclination of the slots relative to a radius of the control plate provide increased mechanical advantage of the weights and pins on the control plate. As the weights and pins move radially outwardly where their centrifugal force is more effective, the greater inclination of the slots reduces the mechanical advantage of the weights on the control plate. The total overall effect of the centrifugal weights is thus equalized at all adjusted positions of the weights.

The net result of the several parts of the transmission is that the driving force transmitted through the eccentric crank is automatically balanced against the load reaction applied against the crank. The transmission automatically seeks the transmission ratio where the power input, through the shaft 11, will drive the load at the maximum possible speed. For example, if at a given steady road speed and level road conditions, the throttle of the driving engine of a vehicle is opened supplying more power, the shaft 11 will tend to speed up and tend to increase the eccentricity of the weights and the crank. However, the resistance of the vehicle to acceleration will impose increased torque resistance to the crank 25 so that the eccentricity of the crank will remain the same or even be reduced while the increased available power accelerates the vehicle. As the excess of available power, i.e. the accelerating force, decreases and the total available power approaches equality with the demand, the decrease in torque reaction plus the increase in crankshaft speed will move the crank 25 toward maximum eccentricity and shift the transmission toward minimum ratio. The optimum ratio will be when the transmission shaft speed and the centrifugal action of the weights at that speed is just sufficient to fully extend the eccentricity of the crank against the reaction torque required to maintain constant velocity of the vehicle. This optimum ratio may occur over a considerable range of vehicle speeds where the power input available up to the maximum output of the engine just balances the power requirement of the vehicle.

It is pointed out that the centrifugal action of the weights 46, which is generally equalized at various operating speeds by the curved slots 44, is applied to the control shaft 24 at a constant moment arm represented by the line AB or BC corresponding to the eccentricity of the shaft 24 relative to the shaft 11. The relatively greater torque reaction force is applied along the vector EC in FIGS. 5 and 6 and this is applied at a variable distance about the axis B of the main shaft that varies from zero when there is no eccentricity of the crank to a relatively small angle represented by the 12° angle at maximum eccentricity of the crank. The relatively greater moment arm of the centrifugal force of the weights permits the weights to control the relatively greater torque reaction force.

It will be understood that the shape of the slots 44 and the mass of the weights 46 as well as other details of the transmission can be varied to meet specific requirements for specific installations. The driving motor may be an electric motor and the load may be something other than an automotive vehicle.

What is claimed as new is:

1. A hydraulic transmission adapted to be connected to an engine drive shaft comprising,
- a pump housing having a pump shaft rotatably mounted therein and connectable to said drive shaft,
- a control shaft rotatably mounted in said pump shaft in eccentric relation thereto,
- a crank on said control shaft and eccentric thereto by an amount equal to the eccentricity of the control shaft to the pump shaft,
- a plurality of radially disposed variable stroke pump element pistons mounted in said pump housing and arranged to be variably driven by said crank,
- a control pin projecting from said control shaft through a motion limiting slot provided therefor in said pump shaft,
- an annular control plate mounted for relative rotation on said pump shaft and drivingly connected to said control pin,
- a guide plate connected to said pump shaft for rotation therewith and positioned alongside said control plate,
- centrifugal weights radially slidably mounted on said guide plate and rotatable therewith,
- connecting means consisting of pins connected to said weights and received in spiral slots in said control plate and connecting said weights to said control plate to rotatably advance said control plate relative to said pump shaft upon radial outward motion of said weights,
- spring means connected between said guide plate on said pump shaft and said control plate and resisting outward motion of said weights and advancing motion of said control plate,
- said spring means being calibrated relative to said weights to prevent advance of said control shaft below a predetermined minimum speed of said pump shaft and permitting maximum advance of the control plate at from 100 to 200 r.p.m. of the pump shaft over said minimum speed.
- said control shaft and crank being arranged for minimum eccentricity of said crank relative to said pump shaft in the retracted adjusted position of said control plate and said weights,
- and means including check valves forming a working liquid circulating system cooperative with said pump element pistons,
- said system being connectable to a working element to be driven by liquid circulated in the system.

2. A hydraulic transmission adapted to be connected to an engine drive shaft comprising,
- a pump housing having a pump shaft rotatably mounted therein and connectable to said drive shaft,
- a control shaft rotatably mounted in said pump shaft in eccentric relation thereto,
- a crank on said control shaft and eccentric thereto by an amount equal to the eccentricity of the control shaft to the pump shaft,
- a plurality of radially disposed variable stroke pump element pistons mounted in said pump housing and arranged to be variably driven by said crank,
- a control pin projecting from said control shaft through a motion limiting slot provided therefor in said pump shaft,
- an annular control plate mounted for relative rotation on said pump shaft and drivingly connected to said control pin,
- a guide plate connected to said pump shaft for rotation therewith and positioned alongside said control plate,
- centrifugal weights radially slidably mounted on said guide plate and rotatable therewith,
- means connecting said weights to said control plate to rotatably advance said control plate relative to said pump shaft upon radial outward motion of said weights,
- spring means resisting outward motion of said weights and advancing motion of said control plate,
- said spring means being calibrated relative to said weights to prevent advance of said control shaft below a predetermined minimum speed of said pump shaft and permitting maximum advance of the control plate at a predetermined r.p.m. of the pump shaft over said minimum speed,
- said control shaft and crank being arranged for minimum eccentricity of said crank relative to said pump shaft in the retracted adjusted position of said control plate and said weights,
- and means including check valves forming a working liquid circulating system cooperative with said pump element pistons,
- said system being connectable to a working element to be driven by liquid circulated in the system.

3. A hydraulic transmission adapted to be connected to an engine drive shaft comprising,
- a pump housing having a pump shaft rotatably mounted therein and connectable to said drive shaft,
- a control shaft rotatably mounted in said pump shaft in eccentric relation thereto,
- a crank on said control shaft and eccentric thereto by an amount equal to the eccentricity of the control shaft to the pump shaft,
- a variable stroke pump element mounted in said pump housing and arranged to be variably driven by said crank,
- a control pin projecting from said control shaft,
- a control plate mounted for rotation about the axis of said pump shaft and drivingly connected to said control pin,
- a guide plate connected to said pump shaft for rotation therewith and positioned alongside said control plate,
- centrifugal weights radially slidably mounted on said guide plate and rotatable therewith,
- means connecting said weights to said control plate to rotatably advance said control plate relative to said pump shaft upon radial outward motion of said weights,
- spring means resisting outward motion of said weights and advancing motion of said control plate,
- said spring means being calibrated relative to said weights to prevent advance of said control shaft below a predetermined minimum speed of said pump shaft and permitting maximum advance of the control plate at a predetermined r.p.m. of the pump shaft over said minimum speed,
- said control shaft and crank being arranged for minimum eccentricity of said crank relative to said pump shaft in the retracted adjustment position of said control plate and said weights,
- and means including check valves forming a working liquid circulating system cooperative with said pump element pistons,
- said system being connectable to a working element to be driven by liquid circulated in the system.

4. A hydraulic transmission adapted to be connected to an engine drive shaft comprising,
- a pump housing having a pump shaft rotatably mounted therein and connectable to said drive shaft,
- a control shaft rotatably mounted in said pump shaft in eccentric relation thereto,
- a crank on said control shaft and eccentric thereto,
- a variable stroke pump element mounted in said pump housing and arranged to be variably driven by said crank,
- a control pin projecting from said control shaft,
- a control plate mounted for rotation about the axis of said pump shaft and drivingly connected to said control pin, a guide plate connected to said pump shaft for rotation therewith and positioned alongside said control plate, centrifugal weights radially slidably mounted on said guide plate and rotatable therewith, means connecting said weights to said control plate to rotatably displace said control plate relative to said pump shaft upon radial outward motion of said weights, spring means resisting outward motion of said weights and displacing motion of said control plate, said spring means being calibrated relative to said weights to prevent displacing of said control shaft below a predetermined minimum speed of said pump shaft and permitting maximum displacement of the control plate at a predetermined r.p.m. of the pump shaft over said minimum speed, said control shaft and crank being arranged for minimum eccentricity of said crank relative to said pump shaft in the retracted adjustment position of said control plate and said weights, and means forming a working liquid circulating system cooperative with said pump element, said system being connectable to a working element to be driven by liquid circulated in the system.

5. A hydraulic transmission comprising, a pump housing having a pump shaft rotatably mounted therein and connectable to a drive shaft, a control shaft rotatably mounted in said pump shaft in eccentric relation thereto, a crank on said control shaft and eccentric thereto, a plurality of radially disposed variable stroke pump element pistons mounted in said pump housing and arranged to be variably driven by said crank, a control pin projecting from said control shaft, an annular control plate mounted for rotation relative to said pump shaft and drivingly connected to said control pin, a guide plate connected to said pump shaft for rotation therewith and positioned alongside said control plate, centrifugal weights radially slidably mounted on said guide plate and rotatable therewith, connecting means consisting of pins connected to said weights and received in spiral slots in said control plate and connecting said weights to said control plate to rotatably advance said control plate relative to said pump shaft upon radial outward motion of said weights, spring means resisting advancing motion of said control plate, said spring means being calibrated relative to said weights to prevent advance of said control shaft below a predetermined minimum speed of said pump shaft and permitting maximum advance of the control plate at from 50 to 100 r.p.m. of the pump shaft over said minimum speed, said control shaft and crank being arranged for minimum eccentricity of said crank relative to said pump shaft in the retracted adjusted position of said control plate and said weights, and means forming a working liquid circulating system cooperative with said pump element pistons, said system being connectable to a working element to be driven by liquid circulated in the system.

6. A hydraulic transmission comprising, a pump housing having a pump shaft rotatably mounted therein and connectable to a drive shaft, a crank rotatably mounted on said pump shaft in variable eccentric relation thereto, a plurality of radially disposed variable stroke pump element pistons mounted in said pump housing and arranged to be variably driven by said crank, a control pin projecting from said shaft through a motion limiting slot provided therefor and connected to said crank in eccentric relation to the axis of rotation of the crank on the shaft, an annular control plate mounted for rotation relative to said pump shaft and drivingly connected to said control pin, a guide plate connected to said pump shaft for rotation therewith and positioned alongside said control plate, centrifugal weights radially slidably mounted on said guide plate and rotatable therewith, connecting means consisting of pins connected to said weights and received in spiral slots in said control plate and connecting said weights to said control plate to rotatably advance said control plate relative to said pump shaft upon radial outward motion of said weights, spring means resisting advancing motion of said control plate, said spring means being calibrated relative to said weights to prevent advance of said control plate below a predetermined minimum speed of said pump shaft and permitting maximum advance of the control plate at an intermediate speed of the pump shaft over said minimum speed, said crank being arranged for minimum eccentricity of said crank relative to said pump shaft in the retracted position of said control plate and said weights, and means forming a working liquid circulating system cooperative with said pump element, said system being connectable to a working element to be driven by liquid circulated in the system.

7. A hydraulic transmission comprising, a pump housing having a pump shaft rotatably mounted therein and connectable to a drive shaft, a crank rotatably mounted on said pump shaft in variable eccentric relation thereto, a variable stroke pump element mounted in said pump housing and arranged to be variably driven by said crank, a control pin projecting from said shaft through a motion limiting slot provided therefor and connected to said crank in eccentric relation to the axis of rotation of the crank on the shaft, an annular control plate mounted for rotation relative to said pump shaft and drivingly connected to said control pin, a guide plate connected to said pump shaft for rotation therewith and positioned alongside said control plate, centrifugal weights radially slidably mounted on said guide plate and rotatable therewith, means connecting said weights to said control plate to rotatably displace said control plate relative to said pump shaft upon radial outward motion of said weights, spring means resisting displacing motion of said control plate, said spring means being calibrated relative to said weights to prevent displacement of said control plate below a predetermined minimum speed of said pump shaft and permitting maximum displacement of the control plate at an intermediate speed of the pump shaft over said minimum speed, said crank being arranged for minimum eccentricity of said crank relative to said pump shaft in the retracted position of said control plate and said weights, and means forming a working liquid circulating system cooperative with said pump element, said system being connectable to a working element to be driven by liquid circulated in the system.

8. A hydraulic transmission adapted to be connected to an engine drive shaft comprising, a pump housing having a pump shaft rotatably mounted therein, a control shaft rotatably mounted in said pump shaft in eccentric relation thereto, a drive element on said control shaft and movable between concentric and non-concentric displaced relation thereto,
a variable stroke pump element mounted in said pump housing and arranged to be variably driven by said drive element,
a control pin projecting from said control shaft through a motion limiting slot provided therefor in said pump shaft,
an annular control plate mounted for relative rotation on said pump shaft and drivingly connected to said control pin,
a guide plate connected to said pump shaft for rotation therewith and positioned alongside said control plate,
centrifugal weights radially slidably mounted on said guide plate and rotatable therewith,
means connecting said weights to said control plate to rotatably displace said control plate relative to said pump shaft upon radial outward motion of said weights,
spring means resisting displacing motion of said control plate,
said spring means being calibrated relative to said weights to prevent displacement of said control shaft below a predetermined minimum speed of said pump shaft and permitting maximum advance of the control plate at a predetermined r.p.m. of the pump shaft over said minimum speed,
said control shaft and drive element being arranged for minimum displacement of said drive element relative to said pump shaft in the retracted adjusted position of said control plate and said weights,
and means forming a working liquid circulating system cooperative with said pump element,
said system being connectable to a working element to be driven by liquid circulated in the system.

9. A hydraulic transmission comprising,
a pump housing having a pump shaft rotatably mounted therein and connectable to a drive shaft,
a crank rotatably mounted on said pump shaft in variable eccentric relation thereto,
a variable stroke pump element mounted in said pump housing and arranged to be variably driven by said crank,
a control pin connected to said crank,
an annular control plate mounted for rotation relative to said pump shaft and drivingly connected to said control pin,
a guide plate connected to said pump shaft for rotation therewith and positioned alongside said control plate,
centrifugal weights radially slidably mounted on said guide plate and rotatable therewith,
means connecting said weights to said control plate to rotatably displace said control plate relative to said pump shaft upon radial outward motion of said weights,
spring means resisting displacing motion of said control plate,
said spring means being calibrated relative to said weights to prevent displacement of said control plate below a predetermined minimum speed of said pump shaft and permitting maximum displacement of the control plate at an intermediate speed of the pump shaft over said minimum speed,
said crank being arranged for minimum eccentricity of said crank relative to said pump shaft in the retracted position of said control plate and said weights,
and means forming a working liquid circulating system cooperative with said pump element,
said system being connectable to a working element to be driven by liquid circulated in the system.

10. A hydraulic transmission comprising,
a pump housing having a pump shaft rotatably mounted therein and connectable to a drive shaft,
a crank rotatably mounted on said pump shaft in variable eccentric relation thereto, a variable stroke pump element mounted in said pump housing and arranged to be variably driven by said crank,
a control pin connected to said crank,
an annular control plate mounted for rotation relative to said pump shaft and drivingly connected to said control pin,
a guide plate connected to said pump shaft for rotation therewith,
centrifugal weights radially slidably mounted on said guide plate and rotatable therewith,
means connecting said weights to said control plate to rotatably displace said control plate relative to said pump shaft upon radial outward motion of said weights,
spring means resisting displacing motion of said control plate,
said spring means being calibrated relative to said weights to prevent displacement of said control plate below a predetermined minimum speed of said pump shaft and permitting maximum displacement of the control plate at an intermediate speed of the pump shaft over said minimum speed,
said crank being arranged for minimum eccentricity of said crank relative to said pump shaft in the retracted position of said control plate and said weights,
and means forming a working liquid circulating system cooperative with said pump element,
said system being connectable to a working element to be driven by liquid circulated in the system.

References Cited in the file of this patent

UNITED STATES PATENTS

| | | |
|---|---|---|
| 2,115,121 | Phillips | Apr. 26, 1938 |
| 2,151,415 | Bennetch | Mar. 21, 1939 |
| 2,471,939 | Davis | May 31, 1949 |
| 2,778,244 | Cornwall | Jan. 22, 1957 |

FOREIGN PATENTS

| | | |
|---|---|---|
| 88,532 | Netherlands | June 16, 1958 |